Feb. 12, 1952   W. E. CARROLL   2,585,368
DIAL INDICATOR
Filed Sept. 19, 1946
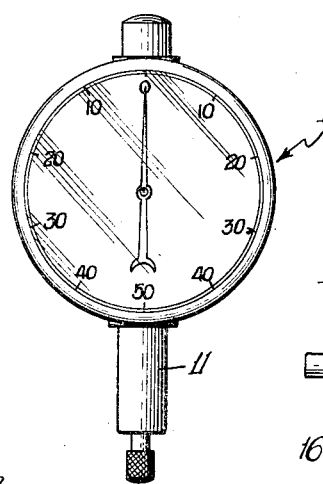
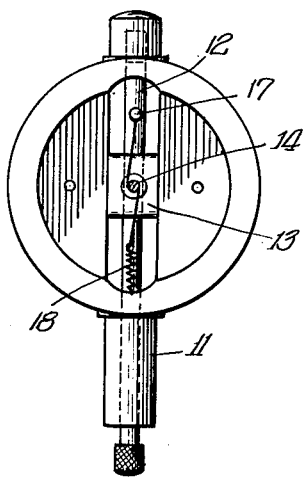
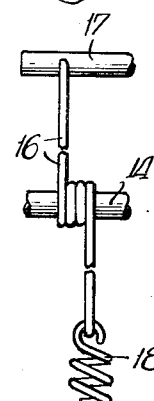
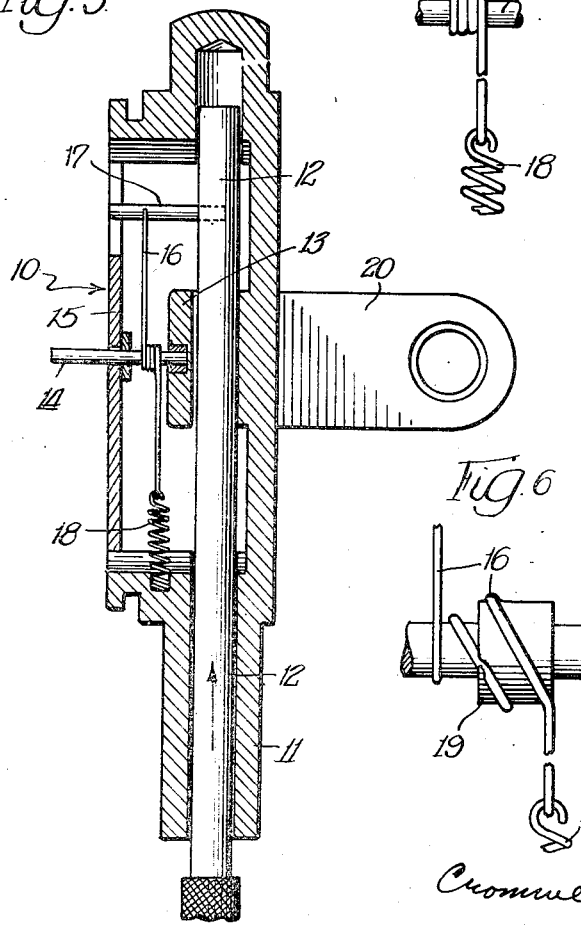
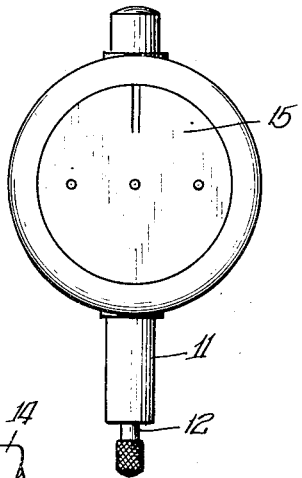
INVENTOR.
Wallace E Carroll,
BY
Cromwell, Greist & Warden
Attys.

Patented Feb. 12, 1952

2,585,368

UNITED STATES PATENT OFFICE 2,585,368

DIAL INDICATOR

Wallace E. Carroll, Chicago, Ill.

Application September 19, 1946, Serial No. 698,005

4 Claims. (Cl. 33—172)

This invention relates to gages. More particularly, it relates to a gage of the dial indicator type in which the indicator is actuated by means of a single continuous strand cooperatively associated with a pressure sensitive reciprocating shaft, and the provision of such a device is a principal object of the invention.

Specifically, it is an object of the invention to provide a dial indicator having a pressure sensitive reciprocating shaft and an indicating spindle mounted in a casing with means including a continuous flexible strand wound around the spindle for actuating the same responsive to the movement of the shaft, the terminal ends of the strand being secured within the casing, and at least one end of the strand being connected to the shaft.

More specifically, it is an object of the invention to provide a dial indicator constituting a pressure sensitive reciprocating shaft and an indicating spindle mounted within a casing with means including a continuous flexible strand of wire or glass, or other suitable material, wound around the spindle to actuate it responsive to the movement of the shaft, the terminal ends of the strand being secured within the casing and at least one end of the strand being connected to a spring member in the casing, and the other end of the strand being connected to an anchor member projecting from the shaft a distance such that the strand is disposed substantially at right angles to the axis of rotation of the spindle.

Another object of the invention is the provision of gage of the character above described which utilizes a spindle collet having a peripheral groove adapted to receive and guide the strand as it is actuated, the collet further being so constructed that it can be made to grip the strand at a selected portion intermediate its ends.

Other objects of the invention will in part be obvious and will in part appear hereinafter.

The invention accordingly comprises an article of manufacture possessing the features, properties, and the relationship of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is an elevational view illustrating a preferred form of dial indicator embodied by the invention;

Fig. 2 is a transverse sectional view through the casing of Fig. 1;

Fig. 3 is an enlarged sectional view of the indicator depicted in Fig. 1;

Fig. 4 is a rear view of the device shown in Figs. 1 through 3;

Fig. 5 is a fragmentary detail of the strand and spring arrangement; and

Fig. 6 is a fragmentary detail of strand and spring arrangement utilizing a spindle collet.

Referring more particularly to the drawing there is shown a casing indicated generally at 10 having a downwardly extending tubular portion 11 in which is mounted a pressure sensitive reciprocating shaft 12. The casing is apertured in its top providing an upwardly extending tubular portion 11' to receive the upward thrust of the upper portion of the shaft. The shaft 12 also is slidably mounted in a bearing 13 within the casing.

Extending toward the shaft 12 is a spindle 14. One end of this spindle is carried by one end of the bearing 13 and the other end of the spindle passes through a slotted front bearing plate 15 in which the shaft 12 is journaled, said plate being secured within an opening in the casing. Secured to the spindle 14 is a conventional finger indicator or pointer.

The spindle 14 is actuated by means of a single continuous strand 16 which can be made of wire, glass, or other suitable material. Preferably, one end of this strand is secured to an anchor post 17 which in turn is connected to the shaft 12, the end of the anchor post projecting sufficiently to ride in the slot of the front plate 15. An intermediate portion of the strand is lapped or wound several times around the spindle 14 and the other end of the strand 16 preferably is connected to a spring 18 secured within the casing 10.

The strand 16 may be wound around the spindle 14 as indicated in Fig. 5, or it may be wound in the grooved portion of a collet 19 secured to the shaft 12 as more fully disclosed in Fig. 6. While the strand is not secured to the shaft 12 in the modification depicted in Fig. 5, it will be observed that the peripheral groove in the collet 19 of Fig. 6 is such that a selected portion of the edges of the groove may be peened over if it is desired to secure the strand 16 firmly in fixed position with respect to the collet so that the strand always maintains its position on the collet after it has been turned in either direction.

The device can conveniently be affixed to a standard by means of the bracket 20 connected to the back of the casing.

In operation, when pressure is brought to bear against the bottom of the shaft 12 it slidably is reciprocated through the tubular portion 11 of the casing, the bearing member 13 and into the apertured portion at the top of the casing. As it moves upwardly, the anchor post 17 moves in the same direction carrying with it the strand 16 which in turn actuates the spindle 14 around which it is wound against the resiliency of the spring 18. Release of pressure against the end of the shaft 12 will cause the same to be returned to its initial position because of the spring 18.

It will thus be seen that the objects hereinbefore set forth may readily and efficiently be attained, and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a dial indicator of the character described, the combination comprising an annular casing having a closed back portion and an open front, a bearing plate secured within said open front, said casing having opposed tubular bearing extensions, a central bearing member upwardly extending from said back portion and provided with a tubular opening in alignment with said tubular bearing extensions, a pressure-sensitive reciprocating shaft slidably mounted within the tubular opening of said central bearing and said tubular bearing extensions, a spindle adapted to receive an indicator at one end, mounted on intermediate portion centrally of said bearing plate, and its other end being journaled in said central bearing in front of, and substantially perpendicularly to said shaft, and a single continuous, flexible strand encircling said spindle, a projecting member on an intermediate portion of said shaft between said central bearing and one of said tubular bearing extensions, one end of said strand being connected to said projecting member and the other end of said strand being connected within said casing between said central bearing and the other of said tubular bearing extensions; whereby to rotate said spindle when said shaft is actuated.

2. In a dial indicator as defined in claim 1, and further characterized in that said other end of said strand is connected to said casing.

3. In a dial indicator as defined in claim 1, and further characterized in that said other end of said strand is connected to said casing by means of a spring member.

4. In a dial indicator as defined in claim 1, and further characterized in that said spindle carries a collet secured thereto, said collet having a helical, peripheral groove therein and an intermediate portion of said strand being wound within said groove around said collet.

WALLACE E. CARROLL.

REFERENCES CITED

The following references are of record in the file of this patent:

UNITED STATES PATENTS

| Number | Name | Date |
|---|---|---|
| 607,898 | Todd | July 26, 1898 |
| 832,152 | Nichols | Oct. 6, 1906 |
| 917,444 | James | Apr. 6, 1909 |
| 1,076,682 | Lucas | Oct. 28, 1913 |
| 1,664,833 | Schaper | Apr. 3, 1928 |
| 1,679,501 | Scusa | Aug. 7, 1928 |
| 1,820,370 | Aldeborgh et al. | Aug. 25, 1931 |

FOREIGN PATENTS

| Number | Country | Date |
|---|---|---|
| 99,898 | Sweden | Aug. 8, 1940 |
| 548,022 | Great Britain | Sept. 22, 1942 |